Patented July 23, 1940

2,209,202

UNITED STATES PATENT OFFICE 2,209,202

METHOD OF CONSOLIDATING SUGAR REFINING WITH THE MANUFACTURE OF MILK CHOCOLATE, CONDENSED MILK, AND OTHER PRODUCTS

William D. Horne, Beech Creek, Pa.

No Drawing. Application December 31, 1937, Serial No. 182,796

1 Claim. (Cl. 99—55)

This invention relates to an improved method of consolidating sugar refining with the manufacture of condensed milk, milk chocolate and other products, an object being to provide a method wherein well-known procedures now in use in manufacturing condensed milk, milk chocolate, &c., as well as in sugar refining may be so coördinated as to avoid duplication of operations and thus eliminate the major part of the expense involved in the refining of raw sugar prior to the introduction of the refined sugar into the process of making condensed milk, milk chocolate, sweetened fruit juices, and so forth.

Another object of the invention is to provide a new method of preparing unrefined sugar and milk solution or unrefined sugar and liquid solution whereby the impurities of the unrefined sugar are removed after the solution has been made.

In manufacturing condensed milk it is common practice to pass the crude milk through mechanical filters or centrifugal clarifiers to remove hairs, small particles of dirt, &c., before dissolving refined sugar in it. The resulting solution is then evaporated in a vacuum pan to the desired density of about 75 parts of solids and 25 parts of water. When milk chocolate is made an exactly similar procedure is followed except that the evaporation is carried farther until only about half as much moisture remains. At this point chocolate liquor is introduced and further drying processes are applied, together with the introduction of cocoa butter. The refined sugar used in these operations has previously been prepared from raw sugar by a series of operations so closely analogous to the above as to offer a very advantageous opportunity to combine them. Raw sugar is first mingled with syrup and then purged in a centrifugal machine and washed with about 2% of water, whereby the purity of the sugar is raised to 99% or even higher. Such washed raw sugar can even more advantageously be prepared directly at the time of centrifugalling in the raw sugar factory. To refine this washed sugar, containing less than 1% of moisture, the refiner dissolves it in about two-thirds its own weight of water, mechanically filters it to remove a slight amount of insoluble matter, subjects it to a decolorizing process to remove more or less of its slight coloring matter, boils it in a vacuum pan to remove most of the water and cause the sugar to crystallize, purges it in a centrifugal machine and gets a yield of about 55%. The run-off from the centrifugal, containing about 45% of the original sugar must be boiled down and centrifugalled repeatedly to obtain most of the sugar, after which residual molasses remains. This extended procedure may all be eliminated and its expense saved by merely introducing the washed raw sugar into the crude milk, where it will dissolve. The clarification of the milk simultaneously removes the slight insoluble matter of the sugar, the evaporation of the milk again brings the mass to the desired moisture content without any extra evaporation as in sugar refining; there is no reprocessing and no residual by-product. In case it be desired to remove any of the small amount of color present this may be accomplished by introducing a small amount of some color-absorbing solid material into the solution of the raw sugar in the milk before clarifying.

Thus, in carrying out the method embodying the invention, unrefined sugar may be mixed with milk or other fluid and then clarified ready for use in making milk chocolate, condensed milk, or other article of commerce. When making milk chocolate for instance, raw (unrefined) sugar is dissolved in a quantity of raw milk. When this takes place any insoluble matter remains suspended in the solution and in order to remove this the solution is clarified by filtering through suitable fabric or by other means, as for instance a centrifugal separator or clarification device. Preferably the raw sugar is previously washed and then added to the milk.

After the sugar has been dissolved in the milk and clarified, the resulting solution is deprived of any desired part of the moisture content in any suitable way, as for instance by being boiled in vacuo. The boiling operation may continue until one-half, three-quarters, or even 95% of the moisture is removed, according to the use to which the solution is to be put after it has been thus treated. When the solution is to be used in making milk chocolate, approximately 85% or more of the moisture content is removed and then the "chocolate liquor" is added, after which the mixture is treated or worked in the usual way of making milk chocolate.

Where it is desired to manufacture condensed milk to be canned or otherwise used on the open market, raw milk and raw sugar (preferably washed) are mixed so that the sugar is thoroughly dissolved. This solution is then clarified by a centrifugal-clarifier machine or by filtration and then the desired moisture content removed by subjecting the solution to heat in vacuum. The heating treatment may continue until the desired moisture content is removed and then the solution may be canned ready for the market or used as may be desired.

It will be understood that various proportions of sugar and milk may be used with this method according to the final product to be produced.

The method also includes the idea of making syrups and other compounds wherein water, fruit juices, or other liquids may be mixed with raw sugar. When raw sugar is dissolved in any of these liquids, the solution is clarified as above mentioned by subjecting the solution to a centrifugal-clarifier machine or to a filtration process. After the insoluble matter has been removed, the solution may be condensed to any desired extent by being boiled in vacuo or open for the desired time.

In any of the variations of the method above mentioned, coloring, or other non-sugar matter contained in the sugar may be readily removed by adding to the milk and sugar solution before it is clarified certain absorbent insoluble materials which will not injure the final product. There are numerous materials to accomplish this result, as for instance tricalcic-phosphate, calcium carbonate, and aluminum hydroxide. When the solution is subjected to the filtration or clarification thereof these solids are also removed. When using such absorbents not only will most of the coloring matter in the sugar be removed but a large part of the colloidal matter as well.

When carrying out the method as outlined it will be readily seen that marked economy is effected because the milk and sugar are simultaneously clarified and then boiled down together to produce a finished solution ready for use in manufacturing different products for the market.

I claim:

The method of refining raw sugar simultaneously with the clarification of milk for the manufacture of a condensed milk and sugar product consisting in washing the raw sugar, thoroughly incorporating the washed sugar in raw milk, treating the sugar solution with a clarifying agent selected from the group consisting of tricalcic-phosphate, calcium carbonate, and aluminum hydroxide, removing undissolved foreign matter from the sugar milk solution including the clarifying agent containing absorbed coloring matter and colloidal matter, then evaporating the solution.

WILLIAM D. HORNE.